(12) United States Patent
Berg et al.

(10) Patent No.: US 12,159,207 B2
(45) Date of Patent: *Dec. 3, 2024

(54) MACHINE LEARNING METHODS AND SYSTEMS FOR CHARACTERIZING CORN GROWTH EFFICIENCY

(71) Applicant: ADVANCED AGRILYTICS HOLDINGS, LLC, Indianapolis, IN (US)

(72) Inventors: William Kess Berg, Clayton, IN (US); Jon J. Fridgen, Lancaster, KY (US); Andrew James Woodyard, Champaign, IL (US); Jonathan Michael Bokmeyer, Zionsville, IN (US); Aaron W. Gault, Greensburg, IN (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,220

(22) Filed: Mar. 15, 2023

(65) Prior Publication Data

US 2023/0359889 A1    Nov. 9, 2023

Related U.S. Application Data

(63) Continuation of application No. 17/739,699, filed on May 9, 2022, now Pat. No. 11,610,157.

(51) Int. Cl.
*G06N 3/08* (2023.01)
*A01G 22/20* (2018.01)
*G06N 20/00* (2019.01)

(52) U.S. Cl.
CPC ............ *G06N 20/00* (2019.01); *A01G 22/20* (2018.02); *G06N 3/08* (2013.01)

(58) Field of Classification Search
None
See application file for complete search history.

(56) References Cited

U.S. PATENT DOCUMENTS

2010/0306012 A1    12/2010   Zyskowski et al.
2020/0273172 A1     8/2020   Weldemariam et al.
(Continued)

OTHER PUBLICATIONS

Gumuscu A, Tenekeci ME, Bilgili AV. Estimation of wheat planting date using machine learning algorithms based on available climate data. Sustainable Computing: Informatics and Systems. Dec. 1, 2020;28:100308. (Year: 2020).*

(Continued)

*Primary Examiner* — Vincent Gonzales
(74) *Attorney, Agent, or Firm* — MARSHALL, GERSTEIN & BORUN LLP; Randall G. Rueth

(57) ABSTRACT

A computing system includes a processor; and one or more non-transitory, computer-readable storage media storing: a trained machine learning model; and machine-readable instructions that, when executed by the one or more processors, cause the computing system to: process agronomic input feature vectors to generate one or more predicted corn growth efficiency values; and provide the corn growth efficiency values as output. A computing system includes a processor; and one or more non-transitory, computer-readable storage media storing machine-readable instructions that, when executed by the one or more processors, cause the computing system to: process labeled agronomic data with a machine learning model to generate one or more predicted corn growth efficiency values; and modify a parameter of the machine learning model. A computer-implemented method includes processing labeled agronomic data with a machine (Continued)

learning model to generate corn growth efficiency values; and modifying a parameter of the machine learning model.

30 Claims, 11 Drawing Sheets

(56) References Cited

U.S. PATENT DOCUMENTS

| | | | |
|---|---|---|---|
| 2020/0279179 A1* | 9/2020 | Chen | G06N 5/04 |
| 2021/0182978 A1 | 6/2021 | Nissing | |
| 2022/0091088 A1 | 3/2022 | Berg et al. | |

OTHER PUBLICATIONS

Balan T, Dumitru C, Dudnik G, Alessi E, Lesecq S, Correvon M, Passaniti F, Licciardello A. Smart multi-sensor platform for analytics and social decision support in agriculture. Sensors. Jul. 24, 2020;20(15):4127. (Year: 2020).

Gilabert MA, Gandia S, Melia J. Analyses of spectral-biophysical relationships for a corn canopy. Remote Sensing of Environment. Jan. 1, 1996;55(1):11-20. (Year: 1996).

Kayad A, Sozzi M, Gatto S, Marinello F, Pirotti F. Monitoring within-field variability of corn yield using Sentinel-2 and machine learning techniques. Remote Sensing. Dec. 3, 2019;11(23):2873. (Year: 2019).

Mortimore CG, Ward GM. Root and stalk rot of corn in southwestern Ontario: III. Sugar levels as a measure of plant vigor and resistance. Canadian Journal of Plant Science. Sep. 1, 1964;44(5):451-7. (Year: 1964).

Ulloa CC, Krus A, Barrientos A, del Cerro J, Valero C. Robotic fertilization in strip cropping using a CNN vegetables detection-characterization method. Computers and Electronics in Agriculture. Feb. 1, 2022;193:106684. (Year: 2022).

Verrelst J, Malenovsky Z, Van der Tol C, Camps-Valls G, Gastellu-Etchegorry JP, Lewis P, North P, Moreno J. Quantifying vegetation biophysical variables from imaging spectroscopy data: a review on retrieval methods. Surveys in Geophysics. May 2019; 40(3):589-629. (Year: 2019).

Zhao Y, Della Justina D. Machine learning approaches for crop growth monitoring using multi-temporal and multi-variety remotely sensed data. InIGARSS 2020-2020 IEEE International Geoscience and Remote Sensing Symposium 2020 (pp. 4890-4893). IEEE. Year: 2020).

International Application No. PCT/US2023/021295, International Search Report and Written Opinion, mailed Jul. 31, 2023.

\* cited by examiner

| Average R1 CGE | 0.84 | 0.85 | 0.88 | 0.92 | 1.73 | 1.78 | 1.78 | 1.80 | 1.81 | 1.82 | 1.83 | 1.93 | 1.93 | 2.41 | 2.41 | 2.43 | 2.60 | 2.80 | 2.92 | 2.93 |
|---|---|---|---|---|---|---|---|---|---|---|---|---|---|---|---|---|---|---|---|---|
| Hybrid A | 97.3 | 94.8 | 100.8 | 81.0 | 75.8 | 81.6 | 70.0 | 79.7 | 79.2 | 70.4 | 82.1 | 66.0 | 65.4 | 87.2 | 62.4 | 89.9 | 80.0 | 85.4 | 78.9 | 63.1 |
| Hybrid B | 153.8 | 120.9 | 125.2 | 152.6 | 112.5 | 111.7 | 75.0 | 120.0 | 106.2 | 81.3 | 80.2 | 123.2 | 97.5 | 102.4 | 85.1 | 114.1 | 93.8 | 85.4 | 95.1 | 112.3 |
| Hybrid C | 99.1 | 99.2 | 99.0 | 92.9 | 99.4 | 92.3 | 126.7 | 88.6 | 99.2 | 104.2 | 97.4 | 118.5 | 109.7 | 106.2 | 99.7 | 100.9 | 91.8 | 108.9 | 112.2 | 119.5 |
| Hybrid D | 71.0 | 106.9 | 63.8 | 87.9 | 105.1 | 93.7 | 65.6 | 110.8 | 78.7 | 116.8 | 92.7 | 80.7 | 109.1 | 116.3 | 96.8 | 80.8 | 107.4 | 98.6 | 121.8 | 106.4 |
| Hybrid E | 108.8 | 86.9 | 102.0 | 110.8 | 98.4 | 109.1 | 119.8 | 113.3 | 105.3 | 92.7 | 102.9 | 90.8 | 101.4 | 124.6 | 139.6 | 81.4 | 144.6 | 109.2 | 87.6 | 112.0 |
| Hybrid F | 64.4 | 95.8 | 107.5 | 80.8 | 107.5 | 100.5 | 134.9 | 74.1 | 91.0 | 113.5 | 102.5 | 101.7 | 77.3 | 67.3 | 72.1 | 106.9 | 71.6 | 81.9 | 66.1 | 56.5 |
| Hybrid G | 105.6 | 95.5 | 101.6 | 93.9 | 101.4 | 111.1 | 108.0 | 113.5 | 140.3 | 98.8 | 131.6 | 140.1 | 130.8 | 96.0 | 144.2 | 126.1 | 110.8 | 130.5 | 138.4 | 130.2 |

FIG. 6

| Average R6 CGE | 0.43 | 0.60 | 0.61 | 0.66 | 0.68 | 0.68 | 0.70 | 0.76 | 0.76 | 0.78 | 0.85 | 0.85 | 0.93 | 0.99 | 1.02 | 1.07 | 1.11 | 1.30 | 1.32 | 1.40 |
|---|---|---|---|---|---|---|---|---|---|---|---|---|---|---|---|---|---|---|---|---|
| Hybrid A | 132.6 | 34.3 | 18.2 | 236.0 | 138.5 | 155.6 | 63.0 | 99.9 | 72.0 | 113.5 | 150.4 | 76.8 | 181.7 | 215.1 | 117.3 | 155.5 | 133.2 | 217.2 | 130.6 | 142.3 |
| Hybrid B | 102.2 | 73.5 | 80.4 | 84.6 | 94.4 | 42.3 | 124.8 | 158.1 | 76.0 | 42.9 | 44.1 | 120.0 | 47.7 | 156.5 | 100.9 | 34.3 | 86.4 | 12.1 | 96.9 | 98.1 |
| Hybrid C | 199.6 | 66.2 | 157.1 | 60.8 | 52.1 | 86.8 | 213.3 | 94.6 | 49.1 | 216.6 | 138.5 | 84.4 | 100.1 | 249.1 | 37.3 | 4.8 | 214.9 | 91.7 | 123.0 | 58.3 |
| Hybrid D | 99.1 | 29.5 | 77.5 | 95.3 | 105.2 | 68.6 | 53.2 | 81.8 | 42.0 | 114.9 | 78.0 | 56.7 | 93.9 | 21.1 | 92.8 | 143.8 | 37.7 | 79.3 | 86.3 | 155.1 |
| Hybrid E | 100.2 | 123.6 | 133.1 | 97.2 | 151.8 | 90.2 | 133.9 | 103.8 | 62.6 | 116.0 | 121.7 | 131.6 | 52.2 | 14.3 | 159.3 | 84.1 | 105.0 | 116.7 | 129.6 | 45.9 |
| Hybrid F | 15.1 | 90.3 | 40.0 | 35.8 | 30.7 | 49.9 | 50.1 | 76.6 | 241.5 | 35.3 | 76.3 | 64.0 | 88.5 | 7.5 | 80.9 | 137.6 | 51.3 | 67.3 | 43.2 | 148.7 |
| Hybrid G | 51.3 | 282.6 | 193.9 | 90.3 | 127.2 | 206.6 | 61.6 | 85.3 | 156.8 | 60.8 | 91.1 | 166.4 | 135.9 | 36.4 | 111.5 | 139.9 | 71.3 | 115.8 | 90.4 | 51.5 |

FIG. 7

MACHINE LEARNING METHODS AND SYSTEMS FOR CHARACTERIZING CORN GROWTH EFFICIENCY

CROSS-REFERENCE TO RELATED APPLICATIONS

This application is a continuation of application Ser. No. 17/739,699, entitled MACHINE LEARNING METHODS AND SYSTEMS FOR CHARACTERIZING CORN GROWTH EFFICIENCY, filed on May 9, 2022, which is incorporated herein by reference in its entirety.

TECHNICAL FIELD

The present disclosure is generally directed to characterizing corn growth, and, more particularly, to machine learning (ML) methods and systems for characterizing corn growth efficiency (CGE), and generating field management recommendations based on CGE values.

BACKGROUND

Growers, field managers, seed companies, and trusted advisors often struggle to gain an understanding of the growing behavior of corn hybrids in agricultural fields. Conventionally used corn growth characteristics are often subjective and based on intuition, anecdote, or other unreliable and unreproducible information. Thus, conventional corn growth characteristics do not lend themselves to objective analysis when trying to understand which corn hybrids will grow well in which fields and under which growing conditions. That is, conventional corn growth characteristics do not lend themselves to objective performance quantification and, thus, may not be useful for comparing performances when making corn hybrid selections and/or managements recommendations. Growers, field managers, seed companies, and trusted advisors are often unsure which corn hybrid to plant in which fields, and/or what agricultural treatments to apply, which can be complicated by the variability among different agricultural fields and growing conditions.

Thus, improved techniques for characterizing corn growth efficiency, and generating field management recommendations are needed.

BRIEF SUMMARY

In an aspect, a computing system includes one or more processors; and one or more non-transitory, computer-readable storage media storing: (i) a machine learning (ML) model trained using a training agronomic data set corresponding to one or more trial agricultural fields, the training agronomic data set labeled with one or more known corn growth efficiency (CGE) values; and (ii) machine-readable instructions that, when executed by the one or more processors, cause the computing system to: (a) process one or more input feature vectors corresponding to an agronomic data set with the ML model to generate one or more predicted CGE values for one or more portions of an agricultural field; and (b) provide the one or more predicted CGE values as an output.

In another aspect, a computing system includes one or more processors; and one or more non-transitory, computer-readable storage media storing machine-readable instructions that, when executed by the one or more processors, cause the computing system to: (i) process an agronomic data set with a machine learning (ML) model to generate one or more predicted corn growth efficiency (CGE) values, the agronomic data set being labeled with one or more known CGE values; and (ii) modify one or more parameters of the ML model.

In yet another aspect, a computer-implemented method includes (i) processing, using one or more processors, an agronomic data set with a machine learning (ML) model to generate one or more predicted corn growth efficiency (CGE) values, the agronomic data set being labeled with one or more known CGE values; and (ii) modifying, using one or more processors, one or more parameters of the ML model.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 depicts an example chart for visualizing CGE values at growth stage R1 among different corn hybrids grown in different locations in a field, according to an embodiment.

FIG. 7 depicts an example chart for visualizing CGE values at growth stage R6 among different corn hybrids grown in different locations in a field, according to an embodiment.

Figure 1:
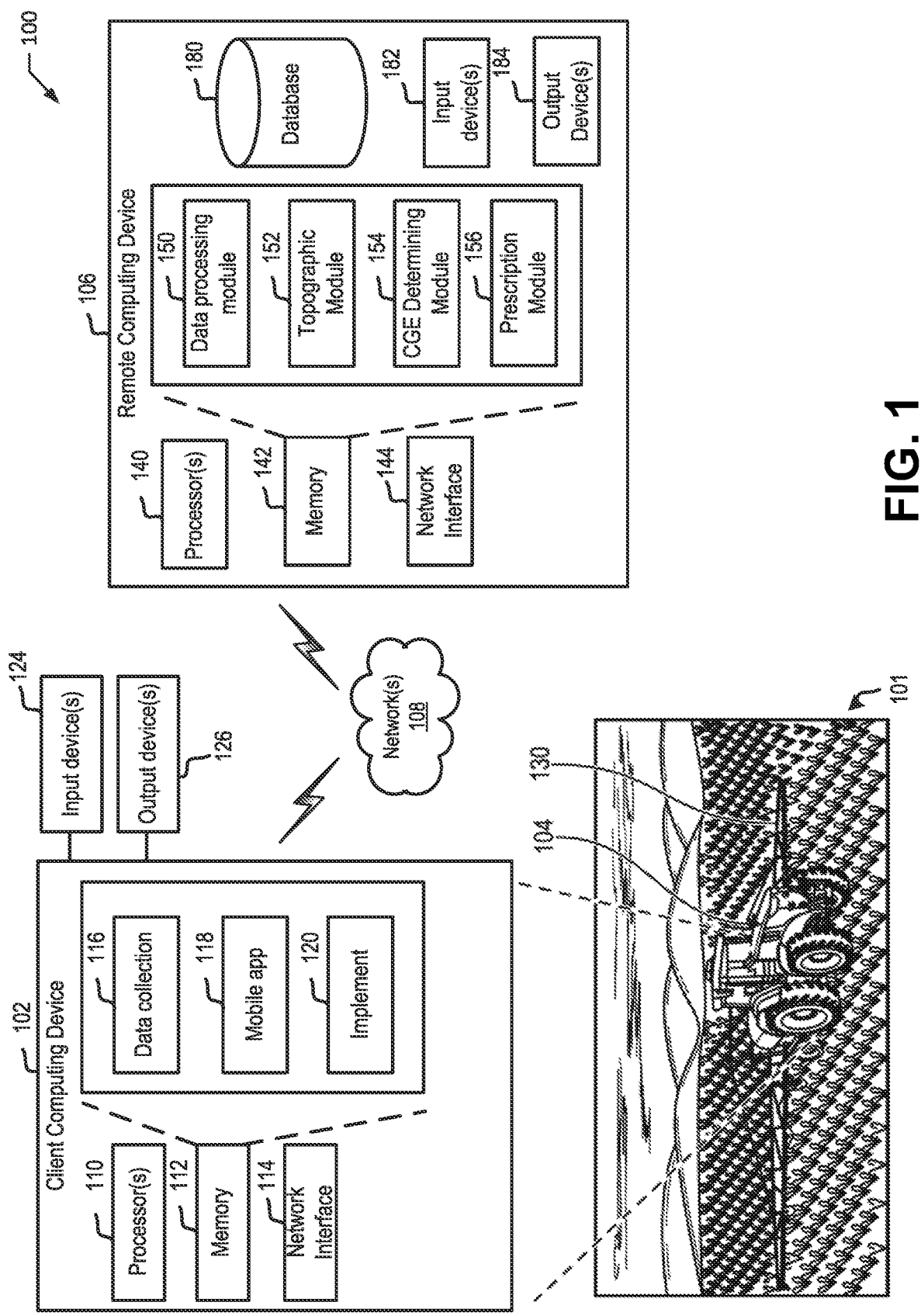
FIG. 1 is a block diagram of an example computing environment, according to an embodiment.

The figures depict embodiments for purposes of illustration only. One of ordinary skill in the art will readily recognize from the following discussion that alternative embodiments of the systems and methods illustrated herein may be employed without departing from the principles of this disclosure.

DETAILED DESCRIPTION

Overview

The present disclosure is generally directed to machine learning (ML) methods and systems for characterizing corn growth efficiency (CGE), and, more particularly, for generating field management recommendations based on one or more determined CGE values within a field, a sub-field, or any portion(s) thereof.

The present techniques advantageously improve the ability of individuals and organizations (e.g., a grower, a trusted advisor, a field manager, a seed company, etc.) that own and/or manage agricultural fields to objectively measure or characterize corn plant growth in those agricultural fields at the field, sub-field, and/or portion(s) thereof level. In particular, the present techniques may be used to determine growth characteristics of corn plants to objectively analyze and inform management decisions and/or to assist in product placement.

Example objective characterizations of the growth and productivity of a corn plant (e.g., a stalk of corn) include corn growth efficiency (CGE) values. Disclosed example CGE values can be used to objectively characterize or represent the growth efficiency of different corn hybrids at different growth stages in response to various environments in which the corn hybrids are growing. The environment can include, or be represented by, any number and/or type(s) of environmental factors such as weather, soil properties, topography, agricultural treatments (e.g., fertilizer, nitrogen, fungicide, etc.) that were applied to corn plants at particular times, corn seed planting timing information, etc. For example, CGE values may be used to objectively characterize how particular corn hybrids respond to drought conditions, high temperatures, excess rain, early planting, late planting, etc.

Generally, example CGE values represent an amount of sucrose stored in a corn plant (i.e., a sucrose reserve). Disclosed CGE values can be determined at different growth stages to represent a growth efficiency of a corn plant at the different growth stages. For example, a CGE value determined at the silking growth stage (R1) represents the sucrose reserve that a corn plant has managed to build up, and which can later be kept as a stored reserve, converted to grow kernels of corn, allocated to grain, etc. Another example CGE value determined at the physiological maturity growth stage (R6) represents how much of the sucrose reserve built up by R1 has been kept as a stored reserve, or converted to grow kernels of corn, allocated to grain, etc. For clarity of description, "silking growth stage R1" will simply be referred to herein as "R1," and "physiological maturity growth stage R6" will simply be referred to herein as "R6." In some examples, a high CGE value at R1 is ideal (e.g., the sucrose reserve at R1 is large), and a low CGE value at R6 is ideal (e.g., sucrose reserve at R6 is just enough to keep the corn plant alive and upright), such that most of the sucrose reserve at R1 has been allocated to grain, converted to production of corn grain dry matter, etc. Such CGE values represent a corn plant that has grown efficiently and vigorously in response to the environment in which it grew, and then efficiently converted sucrose reserves into ears of corn growth. In at least this way, CGE values can be used to objectively characterize or represent the growth efficiency of different corn hybrids at different growth stages in response to various environments in which the corn hybrids are growing. However, CGE values can be used in other ways, and/or can be computed at other growth stages to objectively characterize corn growth efficiency.

An example sucrose reserve of a corn plant at a particular growth stage t (e.g., at R1 or R6) can be expressed mathematically as:

$$SR_t = \Sigma_{i=6}^{8}(C_i \times V_i), \qquad \text{EQN (1)}$$

where $V_i$ is a volume of liquid extracted from an internode i of the corn plant; $C_i$ is the concentration of sucrose in the extracted liquid; and i ranges from 6 to 8 (i.e., internodes 6 to 8 are considered).

In some examples, a sucrose reserve $SR_t$ for a corn plant at a growth stage t is determined using a process that includes (i) collecting the corn plant from a field, sub-field, or portion thereof at the growth stage t; (ii) squeezing each of internodes 6 to 8 of the corn plant to extract as much liquid as possible from each of the internodes; (iii) measuring the amount of liquid $V_i$ extracted from each internode i; (iv) analyzing, for example, using a refractometer, to determine the concentration of sucrose $C_i$ in the liquid extracted from each internode i; and (v) computing the sucrose reserve $SR_t$ using EQN (1).

In some examples, sucrose reserves determined for each of a plurality of corn plants collected from a field, sub-field, or portion(s) thereof at the growth stage t are combined or averaged to compute an average sucrose reserve $SR_t$ for the field, sub-field, or portion(s) thereof (e.g., a hexagrid, as described below) at the growth stage t. Alternatively, the liquid squeezed from each of internodes 6 to 8 of the plurality of plants can be combined to form an aggregate liquid for each of internodes 6 to 8, and the aggregate liquids can be measured and analyzed to determine an average sucrose reserve $SR_t$ for the field, sub-field, or portion(s) thereof at the growth stage t. The average sucrose reserve $SR_t$ at the growth stage t can be used, as described below, to compute an average CGE value for the field, sub-field, or portion(s) thereof (e.g., a hexagrid, as discussed below) at the growth stage t.

In some examples, the above-described process is used to determine sucrose reserves $SR_t$ for (i) a plurality of fields, sub-fields, or portions thereof (e.g., a plurality hexagrids); (ii) a plurality of corn hybrids; and/or (iii) a plurality of growing environments. These processes may be manual processes and/or automated processes (e.g., a process that utilizes one or more automated laboratory instruments or remotely sensed data). For example, a sampling probe can be used to measure sucrose and/or sucrose concentration.

An example CGE value $EFCY_{R1}$ at R1 can be expressed mathematically as:

$$EFCY_{R1} = \frac{SR_{R1}}{(DM_{R1} - DM_{V6})} * DM_{R1}, \qquad \text{EQN (2)}$$

where $DM_{R1}$ is the total amount of dry plant matter in one or more corn plants collected at R1; $DM_{V6}$ is the total amount of dry plant matter in one or more corn plants collected at growth stage V6; and $SR_{R1}$ is the sucrose reserves of the one or more corn plants collected at R1, which can be determined using EQN (1), for example.

In some examples, an amount of dry material $DR_t$ for a corn plant at a growth stage t is determined using a process that includes (i) collecting the corn plant from a field, sub-field, or portion thereof at the growth stage t; (ii) separating the root from the stalk of the corn plant; (iii) drying the stalk; and (iv) weighing the dried stalk to determine the amount of dry material $DR_t$ for the corn plant.

In some examples, amounts of dry material determined for each of a plurality of corn plants collected from a field, sub-field, or portion(s) thereof at the growth stage t are combined to compute an average amount of dry material $DR_t$ for the field, sub-field, or portion(s) thereof at the growth stage t. Average amounts of dry material $DR_t$ can be used in EQN (2) to compute an average CGE value for the field, sub-field, or portion(s) (e.g., a hexagrid) thereof at R1.

Figure 12:
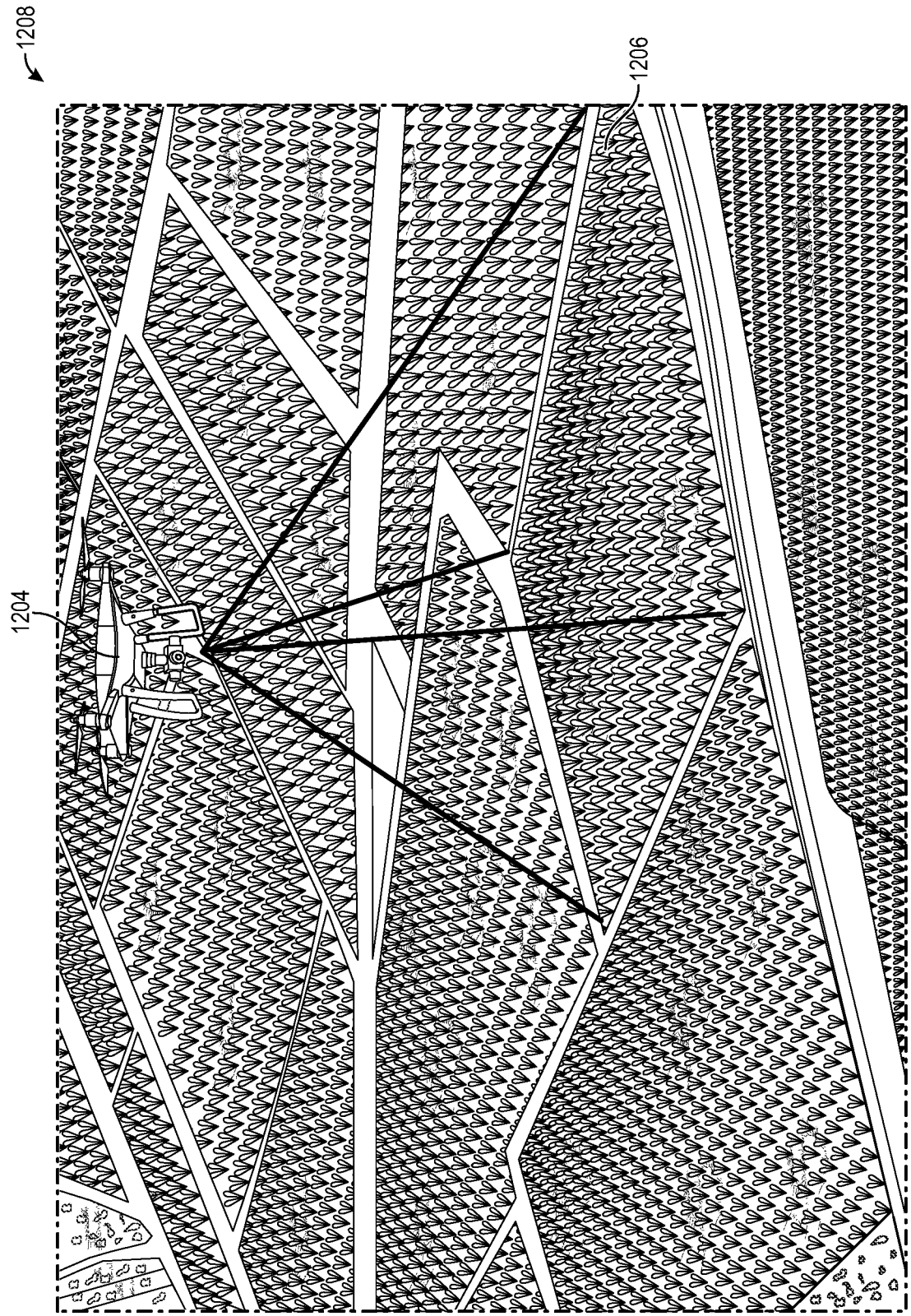
FIG. 12 depicts an example aerial vehicle configured to capture images of an agricultural field.

In some examples, the above-described process is used to determine amounts of dry material $DR_t$ for (i) a plurality of fields, sub-fields, or portions thereof (e.g., a plurality of hexagrids); (ii) a plurality of corn hybrids; and/or (iii) a plurality of growing environments. These processes may be manual processes and/or automated processes (e.g., a process that utilizes one or more automated laboratory instruments). For example, an optical probe can be used to determine mass. Additionally and/or alternatively, plant mass can be quantified by capturing and processing one or more multi-spectral images to determine amounts of plant material, such as the amounts of dry material $DR_t$. For example, as shown in FIG. 12, an unmanned aerial vehicle (e.g., a remotely operated drone 1204, a satellite, etc.) can be used to capture remotely-sensed multi-spectral images of corn plants 1206 growing in one or more fields, sub-fields, and/or portion(s) thereof 1208. Additionally and/or alternatively, a manned aerial vehicle (e.g., a helicopter, balloon, plane, etc.) can be used to capture remotely-sensed multi-spectral images of corn plants growing in one or more fields, sub-fields, and/or portion(s) thereof.

An example CGE value $EFCY_{R6}$ at R6 can be expressed mathematically as:

$$EFCY_{R6} = SR_{R6}, \quad \quad \text{EQN (3)}$$

where $SR_{R6}$ is the sucrose reserve of one or more corn plants collected at R6, and can be determined using EQN (1), for example.

Hybrids with higher CGE values at particular locations or in particular environments may be better suited for the location(s) or environment(s) than other hybrids with lower CGE values at those locations or environments. Hybrids with lower CGE values may indicate an opportunity to increase yield through management practices that would increase sucrose reserves.

The present techniques may include analyzing one or more corn growth characteristics (e.g., CGE values) to identify one or more corn hybrids (e.g., varieties) to plant in one or more fields, sub-fields, or portion(s) thereof based on past, predicted, or anticipated growing environments associated with the fields, sub-fields, or portion(s) thereof. Additionally and/or alternatively, CGE values may be analyzed to determine management strategies (e.g., to determine a planting date, a plant population, a fertilizer timing, a fungicide timing, an insecticide timing, harvesting time, etc.). For example, for a corn hybrid that has a low CGE at R1 (e.g., is poor at creating and storing sucrose), early fertilization may help increase yield. Additionally and/or alternatively, by determining which agricultural treatments are effective for certain hybrids in different growing environments, a grower, seed company, field manager, etc. may save money (e.g., in agricultural materials, fuel consumption, costs to acquire and apply water, etc.) by applying only those treatments that have been found effective for particular hybrids in particular growing environments. Corn growth characteristics may, additionally and/or alternatively, be used by, for example, a seed company, to rate and/or market corn hybrids for different growing environments.

The present techniques may also include collecting machine data, and determining corn growth characteristics (e.g., CGE values) within one or more agricultural fields by analyzing the machine data. In some embodiments, the corn growth characteristics are encoded in spatial data files encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic (e.g., elevation, CGE values, etc.)). The individual layer(s) and/or file(s) may be shared between multiple computing devices of an agricultural company, provided, or sold to customers, stored in a database, etc.

FIG. 1 is a block diagram of an example computing environment 100 in which methods, techniques, systems, and operations disclosed herein can be implemented. The example environment 100 includes an example client computing device 102, an example implement 104, an example remote computing device 106, and an example network 108. Some embodiments include a plurality of client computing devices and/or a plurality of implements.

Example Client Computing Device

The example client computing device 102 can be any type of suitable personal computing device or system. For example, the client computing device 102 can be a mobile computing device (e.g., a mobile computing device, a smart phone, a tablet, a laptop, a wearable device, etc.). In some examples, the client computing device 102 can be temporarily or permanently coupled to the implement 104. The client computing device 102 may be the property of a customer, an agricultural analytics (or "agrilytics") company, an implement manufacturer, a field manager, a seed company, a retailer, a grower, a trusted advisor, etc.

The example client computing device 102 includes one or more processors 110, memory 112, and a network interface controller (NIC) 114. The processor(s) 110 may include any suitable number and/or type(s) of programmable processors, such as microprocessors, microcontrollers, central processing units (CPUs), graphics processing units (GPUs), digital signal processor(s) (DSPs), etc. Generally, the processor(s) 110 are configured to execute machine-readable instructions (e.g., software) stored in the memory 112. Additionally and/or alternatively, the processor(s) 110 may include logic circuits, such as a field programmable gate array (FPGA), an application specific integrated circuit (ASIC), a hardware accelerator, a special-purpose computer chip, a system-on-a-chip (SoC) device, etc. that can implements methods, techniques, operations, etc. described herein without executing software.

The memory 112 can include one or more volatile and/or non-volatile tangible or non-transitory memories (e.g., random access memory (RAM), read only memory (ROM), etc.), storage devices, storage disks, etc. (e.g., a hard disk drive, a flash memory, a compact disc, a digital versatile disc, removable flash memory, etc.) accessible by the processor(s) 110 (e.g., via a memory controller) in which data or machine-readable instructions can be stored for any suitable duration of time (e.g., permanently, for an extended period of time (e.g., while a program associated with the machine-readable instructions is executing), and/or a short period of time (e.g., while the machine-readable instructions are cached and/or during a buffering process)). The processor(s) 110 interact with the memory 112 to obtain, for example, machine-readable instructions stored in the memory 112 corresponding to a data collection module 116, a mobile application module 118, and an implement control module 120, as described in more detail below, or, more generally, operations represented by the flowcharts of this disclosure. More or fewer modules may be included in the memory 112 in some embodiments.

The NIC 114 can include any suitable number and/or type(s) of network interface(s) to enable communication with other machines (e.g., the example implement 104, the example remote computing device 106, etc.) via, for example, one or more networks (e.g., the network 108). Example network interface(s) include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards. In some examples, the NIC 114 is external and communicatively coupled to the client computing device 102 as a peripheral device.

The one or more modules stored in the memory 112 may include respective sets of machine-readable instructions (e.g., software) implementing specific functionality. For example, in an embodiment, the data collection module 116 includes a set of machine-readable instructions for collecting machine data from an implement (e.g., the implement 104) for inclusion in an agronomic data set. The data collection module 116 may include machine-readable instructions for collecting an above-ground and/or below-ground soil sample.

The machine data collection module 116 may include a respective set of machine-readable instructions for retrieving/receiving data from a plurality of different implements. For example, a first set of instructions may be for retrieving/receiving machine data from a first tractor manufacturer's products, while a second set of instructions is for retrieving/receiving machine data from a second tractor manufacturer's products. In another embodiment, the first and second set of instructions may be for, respectively, receiving/retrieving data from tillage equipment and a harvester. Of course, some libraries of machine-readable instructions may be provided by the manufacturers of various implements and/or attachments, and may be loaded into the memory 112 and used by the data collection module 116. The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data may include any information generated by the client computing device 102, the implement 104, and/or the attachments 130. In some cases, the machine data may be retrieved/received via the remote computing device 106 (e.g., from a third-party cloud storage platform). For example, the machine data may include values generated via a soils laboratory or by analyzing a soil sample using a soil analysis attachment 130. The machine data may include sensor measurements of engine load data, fuel burn data, draft, fuel consumption, wheel slippage, etc. The machine data may include one or more time series, such that one or more measured values are represented in a single data set at a common interval (e.g., one-second). For example, the machine data may include a first time series of draft at a one-second interval, a second time series of wheel slippage, etc.

The machine data may include location information. For example, the client computing device 102 may add location metadata to the machine data, such that the machine data reflects an absolute and/or relative geographic position (e.g., location, coordinate, offset, heading, etc.) of the client computing device 102, the implement 104, and/or the attachments 130 within the agricultural field, sub-field, or portion (s) thereof at the precise moment that the client computing device 102 captures the machine data. It will also be appreciated by those of ordinary skill in the art that some sensors and/or agricultural equipment may generate machine data that is received by the client computing device 102, and already includes location metadata added by the sensors and/or agricultural equipment. In an embodiment, wherein the machine data comprises a time series, each value of the time series may include a respective geographic metadata entry. It will be further appreciated by those of ordinary skill in the art that when the machine data is received from a historical archive, the machine data may include historical location data (e.g., the global positioning system (GPS) coordinates corresponding to the location from which the historical machine data was captured).

The machine data collection module 116 may receive, access and/or retrieve the machine data via an application programming interface (API) through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include machine-readable instructions for modifying and/or storing the machine data. For example, the data collection module 116 may parse the raw machine data into a data structure. The data collection module 116 may write the raw machine data onto a disk (e.g., a hard drive in the memory 112).

In some embodiments, the machine data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data. The data collection module 116 may receive (e.g., from a soil probe attachment) soil sample data corresponding to one or more points within the machine data.

The mobile application module 118 may include machine-readable instructions (e.g., software) that display one or more graphical user interfaces (GUIs) on one or more output devices 126 and/or receive user input via one or more input devices 124. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for the mobile phone. When the client computing device 102 is a tablet, the mobile application module 118 may correspond to an application with tablet-specific features. Example GUIs that may be displayed by the mobile application module 118, and with which the user may interact, display or present location-aware planting and/or agricultural treatment recommendations on a per hexagrid basis.

The mobile application module 118 may include machine-readable instructions for receiving/retrieving mobile application data from the remote computing device 106. In particular, the mobile application module 118 may include machine-readable instructions for transmitting user-provided login credentials, receiving an indication of successful/unsuccessful authentication, and other functions related to the user's operation of the mobile application. The mobile application module 118 may include machine-readable instructions for receiving, accessing, retrieving, rendering, and/or displaying visual maps in a GUI. An example visual map represents location-aware planting and/or agricultural treatment recommendations on a per hexagrid basis. Specifically, the application module 118 may include machine-readable instructions for displaying one or more map layers in the output device(s) 126 of the client computing device 102.

The implement control module 120 includes machine-readable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate, collect a soil sample using a soil probe, or change hybrids on a planter.

In some embodiments, the implement control module 120 may cause one of the attachments 130 to raise or lower the disc arm of tillage equipment, or to apply more or less downward or upward pressure on the ground. In some embodiments, the implement control module 120 may control the attachments 130 in response to a predicted CGE value corresponding to the agricultural field where the implement 104 is positioned. For example, the implement control module 120 may access known or predicted CGE values for the field, and use the CGE values to automatically determine a corn hybrid to plant and/or an agricultural treatment to apply, and then automate the attachments 130 to plant the corn hybrid and/or apply the agricultural treatment. Practically, the implement control module 120 has at least as much control of the implement 104 and/or attachments 130 as does the human operator.

The implement control module 120 may include a respective set of machine-readable instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling a tiller and a harvester. Of course, many configurations and uses are envisioned beyond those provided by way of example.

In some embodiments, the implement control module 120 may include machine-readable instructions for executing one or more agricultural prescriptions with respect to a field. For example, the control module 120 may execute an agricultural prescription that specifies, for a given agricultural field, a varying application rate of a chemical (e.g., a fertilizer, an herbicide, a pesticide, etc.) or the hybrid to plant at various points along the path based on the clay characteristics of the field. The control module 120 may analyze the current location of the implement 104 and/or the attachments 130 in real-time (i.e., as the control module 120 executes the agricultural prescription).

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachment 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, a tiller, a planter, a baler, a sprayer, an irrigator, a sorter, a harvester, etc. The implement 104 may include one or more sensors (not depicted) including one or more soil probe and the implement 104 may be coupled to one or more attachments 130. For example, the implement 104 may include one or more sensors for measuring respective implement values of engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., field cultivator, disc, planter). The attachments 130 may include one or more sensors (not depicted) that may differ in number and/or type according to the respective type of the attachments 130 and the particular embodiment/scenario. For example, a tiller attachment 130 may include one or more soil coring probes. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., IEEE 802.11, WiFi, Bluetooth®, universal serial bus (USB), etc.) and main/auxiliary control (e.g., 7-pin, 3-pin, etc.). The client computing device 102 may communicate bidirectionally (i.e., transmit data to, and/or receive data from) with the remote computing device 106 via the network 108.

The client computing device 102 includes the input device(s) 124 and output device(s) 126. The input device(s) 124 may include any suitable device or devices for receiving input, such as one or more microphone, one or more camera, a hardware keyboard, a hardware mouse, a capacitive touch screen, etc. The output device(s) 126 may include any suitable device for conveying output, such as a hardware speaker, a computer monitor, a touch screen, etc. In some cases, the input device(s) 124 and the output device(s) 126 may be integrated into a single device, such as a touch screen device that accepts user input and displays output. The client computing device 102 may be associated with (e.g., leased, owned, and/or operated by) an agrilytics company.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

Example Remote Computing Device

The remote computing device 106 includes one or more processors 140, memory 142, and a NIC 144. The processor(s) 140 may include any suitable number and/or type(s) of programmable processors, such as microprocessors, microcontrollers, CPUs, GPUs, DSPs, etc. Generally, the processor(s) 140 are configured to execute machine-readable instructions (e.g., software) stored in the memory 142. Additionally and/or alternatively, the processor(s) 140 may include logic circuits, such as an FPGA, an ASIC, a hardware accelerator, a special-purpose computer chip, a SoC device, etc. that can implements methods, techniques, operations, etc. described herein without executing software.

The memory 142 may include one or more volatile and/or non-volatile tangible or non-transitory memories (e.g., RAM, ROM, etc.), storage devices, storage disks, etc. (e.g., a hard disk drive, a flash memory, a compact disc, a digital versatile disc, removable flash memory, etc.) accessible by the processor(s) 140 (e.g., via a memory controller) in which data or machine-readable instructions may be stored for any suitable duration of time (e.g., permanently, for an extended period of time (e.g., while a program associated with the machine-readable instructions is executing), and/or a short period of time (e.g., while the machine-readable instructions are cached and/or during a buffering process)). The processor(s) 140 interact with the memory 142 to obtain and execute, for example, machine-readable instructions stored in the memory 142 corresponding to a data processing module 150, a topographic module 152, a CGE determining module 154, a prescription module 156, as described in more detail below, or, more generally, operations represented by the flowcharts of this disclosure. More or fewer modules may be included in the memory 142, some embodiments.

The NIC 144 may include any suitable number and/or type(s) of network interface(s) to enable communication with other machines (e.g., the example client computing device 102, etc.) via, for example, one or more networks (e.g., the network 108). Example network interface(s) include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards. In some examples, the NIC 144 is external and communicatively coupled to the client computing device 102 as a peripheral device.

In an embodiment, the data processing module 150 includes machine-readable instructions for receiving/retrieving data from the client computing device 102, the implement 104, and/or the attachments 130. For example, the data processing module 150 may include machine-readable instructions that when executed by the processor 140, cause the remote computing device 106 to receive/access/retrieve agronomic data that may include machine data, for example. The data processing module 150 may include further machine-readable instructions for storing the agronomic data in one or more tables of a database 180. The data processing module 150 may store raw agronomic data, or processed data.

The data processing module 150 may include machine-readable instructions for processing the raw agronomic data to generate processed data. For example, the processed data may be data that is represented using data types data of a programming language (e.g., R, C #, Python, JavaScript, etc.). The data processing module 150 may include machine-readable instructions for validating the data types present in the processed data. For example, the data processing module 150 may verify that a value is present (i.e., not null) and is within a particular range or of a given size/structure. In some embodiments, the data processing module 150 may transmit processed data from the database 180 in response to a query, or request, from the client computing device 102. The data processing module 150 may transmit the processed data via HTTP or via another data transfer suitable protocol.

In some examples, the data processing module 150 of FIG. 1 includes a set of computer-executable instructions for analyzing remotely-sensed imagery (e.g., high-resolution visible and/or near-infrared (VNIR) imagery) to estimate plant physiological properties such as amounts of plant material and/or amounts of dry plant material. In some examples, such as that shown in FIG. 12, an unmanned aerial vehicle (e.g., a remotely operated drone 1204, a satellite, etc.) can be used to capture remotely-sensed multi-spectral images of corn plants 1206 growing in one or more fields, sub-fields, and/or portion(s) thereof 1208. Additionally and/or alternatively, a manned aerial vehicle (e.g., a helicopter, balloon, plane, etc.) can be used to capture remotely-sensed multi-spectral images of corn plants growing in one or more fields, sub-fields, and/or portion(s) thereof. The data processing module 150 may include further computer-executable instructions for analyzing the plant physiological properties to compute one or more CGE values. Specifically, the data processing module 150 can include instructions for extracting one or more combinations of spectral bands (e.g., one or more vegetation indices, one or more derivative spectroscopy values, etc.) from the remotely-sensed imagery, and analyze the combinations of spectral bands to predict CGE values.

The topographic module 152 may include machine-readable instructions for retrieving, accessing, and/or providing mapping data (e.g., electronic map layer objects) to other modules in the remote computing device 106. The mapping data may take the form of raw data. In some embodiments, the topographic module 152 may include spatial data files. The topographic module 152 may store mapping data in, and retrieve mapping data from, the database 180. The topographic module 152 may source elevation data from public sources, such as the United States Geological Survey (USGS) National Elevation Dataset (NED) database. In some embodiments, the data processing module 150 may provide raw data to the topographic module 152, wherein machine-readable instructions within the topographic module 152 infer the elevation of a particular tract of land by analyzing the raw data. The elevation data may be stored in a two-dimensional (2D) or three-dimensional (3D) data format, depending on the embodiment and scenario.

Example Corn Growth Efficiency (CGE) Value Determination

The CGE determining module 154 may process an agronomic data set (e.g., stored in the database 180) to predict one or more CGE values corresponding to one or more fields, sub-fields, and/or portion(s) thereof. In some embodiments, fields, sub-fields, and/or portion(s) thereof are divided into a grid of hexagonal cells, called "hexagrids" herein. In some embodiments, the hexagrids are 8.5 meters across. In some embodiments, the CGE determining module 154 may process the agronomic data set to train and operate a machine learning (ML) model, as described below with respect to FIG. 2.

Example agronomic data that may be included in an agronomic data set includes machine data (e.g., as described above), topographic data (e.g., as described above), information related to one or more agricultural treatments applied to fields, sub-fields, and/or portion(s) thereof, information related to dates when agricultural treatments were applied, information related to which corn hybrids were planted in which fields, sub-fields, and/or portion(s) thereof, information related to when fields, sub-fields, and/or portion(s) thereof were planted, weather information for the fields, sub-fields, and/or portion(s) thereof, etc. However, any other data related to a growing environment may be included in the agronomic data set.

Figure 2:
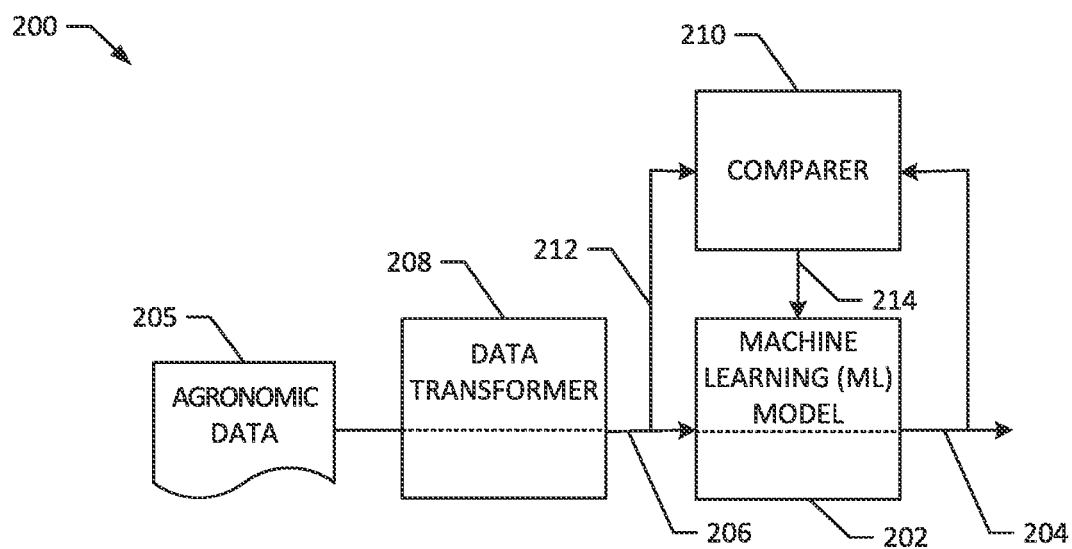
FIG. 2 is a block diagram of an example implementation of the corn growth efficiency (CGE) determining module of FIG. 1, according to an embodiment.

FIG. 2 is a block diagram of an example CGE determining module 200 that may be used to implement the CGE determining module 154 of FIG. 1. The CGE determining module 200 may include machine-readable instructions for training and operating one or more ML models 202 to predict one or more CGE values 204 corresponding to an agricultural field, sub-field and/or portion(s) thereof based on input vectors of agronomic data 205 (e.g., data collected and/or processed by the data processing module 150) or values determined from the agronomic data 205 (e.g., an average, etc.). Example ML models 202 include an artificial neural network, a multinomial logistic regression model, a decision tree, a gradient boosting model, a random forest model, a logistic regression model, etc. The predicted CGE values 204 may be associated with one or more hexagrids.

The block diagram includes a data transformer 208 that generates one or more input data vectors 206 for the ML model 202 by transforming the agronomic data 205. Specifically, the data transformer 208 may include machine-readable instructions for processing the agronomic data 205 to generate input feature vectors 206 for the ML model 202. For example, the data transformer 208 may compute averages, remove noise, convert units, compute a value of a first type from a value of a second type, compute a value or index based on one or more physical measurements, etc. An example input feature vector 206 for the ML model 202 includes one or more of soil topography, relative elevation, slope, latitude, growing season length, incident solar radiation, phosphorus fertility, potassium fertility, soil wetness index (SWI), organic matter, CEC, planting date, corn hybrid planted, applied agricultural treatments, treatment dates, weather information, environmental stresses, etc. with respect to one or more locations within a field, sub-field, or portion(s) thereof.

For example, the input feature vectors 206 may be labeled with the geographic coordinates of a respective hexagrid corresponding to the input values and, when known, respective CGE values determined by processing one or more plants collected from within the hexagrid. For example, a field may include a plurality of hexagrids, wherein each hexagrid includes a respective plurality of corn plants. The present techniques may include determining a respective CGE value for each of the corn plants, and assigning the respective CGE value to each respective plant. In some cases, CGE values may be aggregated at the hexagrid level.

The present techniques may determine the respective CGE value using a manual process and/or an automated process. Specifically, one or more humans may manually process corn plants as described above, and enter the information into a computer, associating each plant's CGE value with the agronomic data 205. In other embodiments, an implement may generate machine data, wherein the generated machine data includes point data including respective CGE values for each point in an agricultural field. In this way, the present techniques may analyze an individual field/sub-field (e.g., one or more hexagrids) to identify individual corn plants, the respective CGE value of each of the plants, and/or respective CGE values across the hexagrid(s).

Returning to FIG. 2, the CGE determining module 200 may train the ML models 202 by implementing a comparer 210. When the CGE determining module 200 is training the ML models 202, the data transformer 208 may generate input feature vectors 206 using the agronomic data 205 that include known CGE values 212 (e.g., wherein the CGE values 212 were manually determined, as described above). In this way, the agronomic data 205 may be labeled data, and the data transformer 208 may preserve such labels when transforming the agronomic data 205. Specifically, each input feature vector 206 may include a respective label corresponding to the CGE value of each respective input vector 206. Training the ML model 202 may include repeatedly inputting labeled data and evaluating a loss function until the loss moves toward a minima (e.g., until the model converges). The ML models 202 may process each vector of input data 206 to learn to predict the one or more CGE values 204.

In general, the present techniques may train the ML models 202 by, inter alia, establishing a network architecture, or topology, and adding one or more layers that may be associated with one or more respective activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples (e.g., training samples labeled using one or more observed/measured CGE values). Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or trained and operated in conjunction. The ML models 202 may include machine-readable instructions executed by a processor or a processing element using supervised or unsupervised machine learning, and the machine learning module may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, a deep learning artificial neural network may be trained using historical machine data to generalize about previously unseen machine data. The ML models 202 may store one or more trained ML models in a memory and/or in an electronic database. The ML models 202 may transmit trained ML models to another component of the computing environment 100 (e.g., the client computing device 102).

In particular, the comparer 210 may compute differences 214 between the known CGE values 212 and the corresponding predicted CGE values 204, and the ML model 202 updates one or more of its parameters (e.g., coefficients, weights, etc.) based upon the differences 214 using, for example, predictive modeling. The process may be repeated until a statistical measure (e.g., root mean square (rms), least squares, quadratic loss, etc.) of the differences 214 satisfies a predetermined threshold. The comparer 210 may use a gradient descent optimization algorithm to minimize the differences 214.

In operation, the CGE determining module 200 may be used to infer or predict one or more CGE values for a field, sub-field, or portion(s) thereof that was not used to train the CGE determining module 200. That is, the CGE determining module 200 may train the one or more ML models 202 using labeled data as described above. Next, agronomic data 205 corresponding to an agricultural field may be collected, as described above. The agronomic data 205 may be transformed by the data transformer 208 to generate input feature vectors 206. The trained ML models 202 may process the input feature vectors 206 to determine one or more respective predicted CGE values 204.

Returning to FIG. 1, the prescription module 156 includes machine-readable instructions for generating one or more agricultural prescriptions. The agricultural prescriptions may be a set of instructions for performing one or more agricultural interventions with respect to an agricultural field. For example, the agricultural prescription may include one more map layers specifying a respective set of interventions relating to seeding, fertilization, tillage, etc. The client computing device 102 may receive/retrieve the prescription instructions, and execute them.

The prescription module 156 may include computer-executable instructions that when executed, cause one or more agricultural prescriptions, or scripts to be generated. The agricultural prescriptions may include machine-readable instructions for causing an implement (e.g., the implement 104) to perform one or more tasks (e.g., instruct a planter to switch from product A to product B). The prescription may include instructions causing the implement 104 to perform a task in a predetermined way (e.g., plant specific seeds at a specific rate and at a specific location) when 1) the location of the implement 104 coincides with a particular CGE value; and 2) the location of the implement 104 coincides with a particular field, as determined by reference to the field map layer. In this way, the prescription module 156 may generate prescriptions executable by a client device for modifying how seeds are planted, treated, or otherwise managed.

In some examples, the computing device 102 may include instructions (e.g., in the mobile app 118) that, when executed, cause one or more of the prescriptions generated by the prescription module 156 to be downloaded into the memory 112 of the client computing device 102. The instructions may further cause the client computing device 102 to control the implement 104 in order to carry out the specific instructions of the downloaded prescription, such that, for example, the client computing device 102 is caused to perform an agricultural management operation in response to a CGE value at a particular location within the field. For example, the client computing device 102 may receive location information from a location module (not depicted) such as a GPS module of the client computing device 102. When the implement 104 is being operated over a particular location (e.g., a hexagrid) having a particular CGE value, the instructions of the prescription may cause an amount of fertilizer to be dispensed by the attachment 130 of the implement 104, and/or a particular seed hybrid to be deposited. The amount of fertilizer to be dispensed, or the hybrid to be planted in this example may be determined by the ML model 202 of FIG. 2, for example. It will be appreciated by those of ordinary skill in the art that many other agricultural management operations are envisioned.

The database 180 may be implemented as a relational database management system (RDBMS), in some embodiments. For example, the database 180 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 130. The database 180 may include a Lightweight Directory Access Protocol (LDAP) directory, in some embodiments. The client computing device 102 may include a module (not depicted) including a set of machine-readable instructions for querying an RDBMS, an LDAP server, etc. For example, the client computing device 102 may include a set of database drivers for accessing the database 180 of the remote computing device 106. In some embodiments, the database 180 may be located remotely from the remote computing device 106, in which case the remote computing device 106 may access the database 180 via the NIC 114 and the network 108.

The remote computing device 106 may further include one or more input devices 182, and one or more output devices 184. The input device(s) 182 may include any suitable device or devices for receiving input, such as one or more microphones, one or more cameras, a hardware keyboard, a hardware mouse, a capacitive touch screen, etc. The input device(s) 182 may allow a user (e.g., a system administrator) to enter commands and/or input into the remote computing device 106, and to view the result of any such commands/input in the output device(s) 184. For example, an employee of the agrilytics company may use the input device 182 to adjust parameters with respect to one or more agricultural fields for planting, applying treatments, etc.

The output device(s) 184 may include any suitable device for conveying output, such as a hardware speaker, a computer monitor, a touch screen, etc. The remote computing device 106 may be associated with (e.g., leased, owned, and/or operated by) an agrilytics company. The remote computing device 106 may be implemented using one or more virtualization and/or cloud computing services. One or more application programming interfaces (APIs) may be accessible by the remote computing device 106.

In operation, the agrilytics company may access the remote computing device 106 to establish one or more field records on behalf of one or more growers. For example, the company may store the field records in the database, wherein each grower is associated with a unique identifier (e.g., a universally unique identifier (UUID)) as are each of the grower's respective fields. For example, the grower may be associated with the grower's fields in the database via a one-to-many relationship.

The agrilytics company may populate the database 180 with agronomic data corresponding to the grower's fields by using the implement 104 to drive the fields and collect machine data and/or other growing environment data. The machine data may include information gathered from an attachment 130 (e.g., a soil probe) and/or machine data collected from other sources. The agrilytics company may additionally populate the database 180 with CGE values corresponding to the grower's fields by sampling and processing corn plants, as described above. Once the agronomic data and CGE values for the grower's fields have been collected, the CGE determining module 154 may process the agronomic data to determine predicted CGE values. The CGE values may be assigned to one or more hexagrids within the field.

The prescription module 156 may include machine-readable instructions that analyze the CGE values of the field and determine one or more treatments for affecting portions of the field. For example, the prescription module 156 may be pre-programmed to switch corn varieties (e.g., corn hybrids) when specific environmental characteristics (i.e., soil, topography) change within a hexagrid or combination of hexagrids. The instructions for switching corn varieties may vary based on the predicted CGE values of the hexagrid. It should be appreciated that the examples provided are intentionally simplified for explanation, and many further embodiments are envisioned, as described below.

While the CGE determining module 154 and prescription module 156 are described with reference to the remote computing device 106, the CGE determining module 154, prescription module 156 and/or portion(s) thereof may be implemented by the client computing device. For example, the remote computing device 106 may implement the CGE determining module 154 to train a machine learning model (e.g., the model 202) that is subsequently used by a CGE determining module 154 implemented by the client computing device 102 to process de novo agronomic data to predict CGE values that are used by a prescription module 156 implemented by the client computing device 102 to develop agricultural prescriptions.

Example Computer-Implemented Methods

Figure 3:
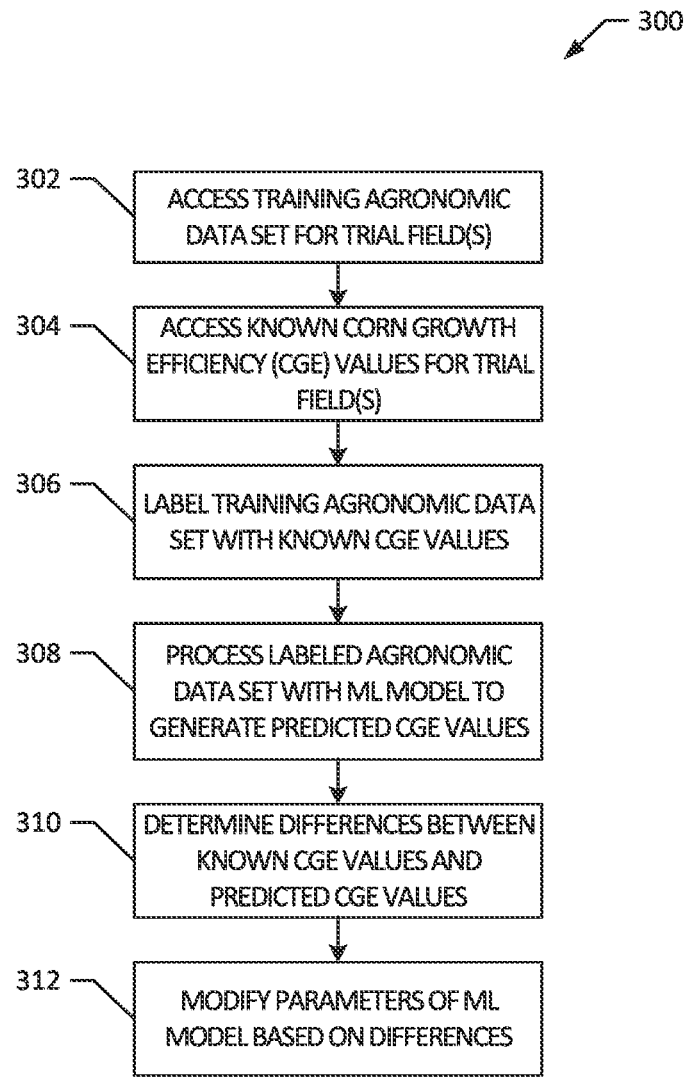
FIG. 3 is a flow diagram of an example computer-implemented method for training a machine learning (ML) model for predicting CGE values within an agricultural field, according to an embodiment.

FIG. 3 depicts a flow diagram of an example computer-implemented method 300 for training a ML model (e.g., the model 202) to predict one or more CGE values within an agricultural field, according to one embodiment. The method 300 may be implemented as an executable program or portion of an executable program for execution by a processor such as one of the processors 110, 140 of FIG. 1. The program may be embodied in machine-readable instructions stored on a non-transitory or tangible machine-readable storage medium such as a compact disc (CD), hard disk drive (HDD), digital versatile disk (DVD), Blu-ray disk, cache, flash memory, read-only memory (ROM), random access memory (RAM), or any other storage device or storage disk associated with the processor 110, 140 in which information may be stored for any duration (e.g., for extended time periods, permanently, for brief instances, for temporarily buffering, and/or for caching of the information). The order of execution of the blocks of FIG. 3 may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), ASIC, FPGA, etc. structured to perform the corresponding operation(s) without executing software or instructions.

The method 300 may include accessing a training agronomic data set corresponding to one or more trial agricultural fields (block 302). A trial agricultural field may be a field from which corn plants are collected and processed to determine known CGE values, and for which agronomic data is collected that is used to train an ML model for predicting CGE values. The training agronomic data set may include labeled data corresponding to the trial agricultural field(s) (e.g., one or more measurements taken using a soil probe corresponding to soil values, as described above). In some embodiments, the training agronomic data set may include historical agronomic data collected previously. The training agronomic data may be collected by the implement 104, or another process/actor, in some embodiments. The training agronomic data may also be collected from other databases (e.g., a historical weather database) or other sources. The method 300 may include accessing known CGE values corresponding to the trial agricultural field(s) (block 304). For example, the method 300 may access a respective CGE value for each of a plurality of hexagrids.

In some embodiments, the method 300 may include labeling the training agronomic data with the known CGE values (block 306). The method 300 may include processing the labeled agronomic data with the ML model 202 to train one or more ML models to generate predicted CGE values corresponding to the known CGE values (block 308). The method 300 may include computing differences between the known CGE values and the predicted CGE values (block 310). The method 300 may include updating one or more parameters (e.g., coefficients, weights, etc.) of the ML model 202 based upon the differences (block 312). The method 300 may include repeating blocks 308-412 until a statistical measure (e.g., rms, least squares, etc.) of the differences 214 satisfies a predetermined threshold. The method 300 may include storing the trained ML models and/or the weights/parameters of each of the respective trained ML models in a non-transitory memory and/or an electronic database for later use (e.g., to predict one or more CGE values corresponding to an agricultural field, an agricultural sub-field, a hexagrid, etc.).

Figure 4:
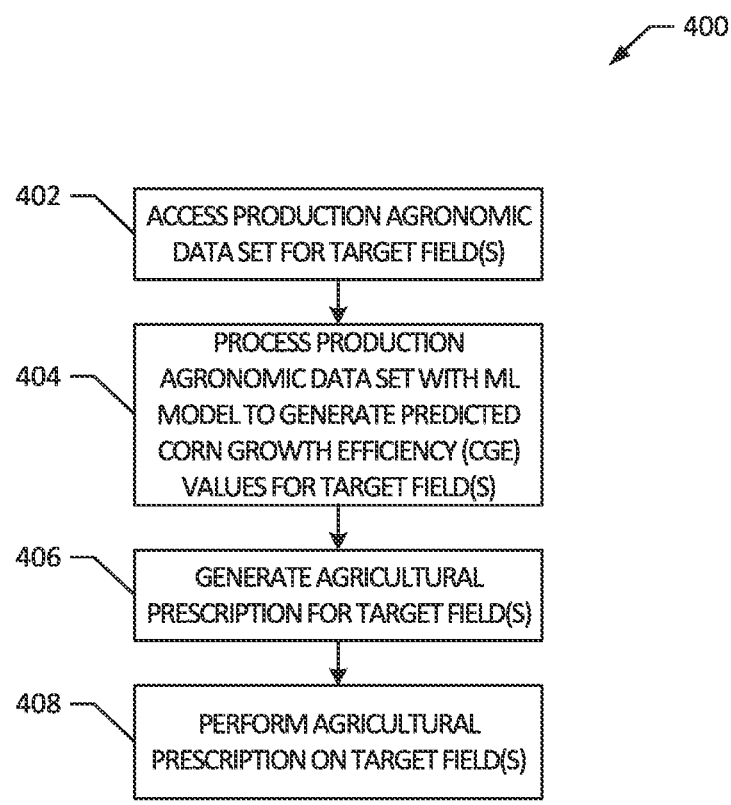
FIG. 4 is a flow diagram of an example computer-implemented method for improving agricultural treatment application within an agricultural field, according to an embodiment.

FIG. 4 depicts a flow diagram of an example computer-implemented method 400 for improving agricultural treatment application within an agricultural field, according to one embodiment and scenario. The method 400 may be implemented using an executable program or portion of an executable program for execution by a processor such as one of the processors 110, 140 of FIG. 1. The program may be embodied in software and/or machine-readable instructions stored on a non-transitory or tangible machine-readable storage medium such as a CD, HDD, DVD, Blu-ray disk, cache, flash memory, ROM, RAM, or any other storage device or storage disk associated with the processor 110, 140 in which information may be stored for any duration (e.g., for extended time periods, permanently, for brief instances, for temporarily buffering, and/or for caching of the information). The order of execution of the blocks of FIG. 4 may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), ASIC, PLD, FPGA, FPLD, logic circuit, etc. structured to perform the corresponding operation(s) without executing software or instructions.

The method 400 may include collecting a production agronomic machine data set corresponding to one or more target agricultural field(s) (block 402). A target agricultural field may be a field for which an agricultural prescription is to be determined and applied based on predicted CGE values. The production agronomic data set may include labeled data corresponding to the trial agricultural field(s) (e.g., one or more measurements taken using a soil probe corresponding to soil values, as described above). In some embodiments, the production agronomic data set may include historical agronomic data collected previously for the target agricultural field(s). The production agronomic data may be collected by the implement 104, or another process/actor, in some embodiments. The production agronomic data may also be collected from other databases (e.g., a historical weather database) or other sources.

The method 400 may include analyzing the production agronomic data set with the one or more trained ML models 202 to predict one or more CGE values corresponding to one or more respective hexagrids located within the target agricultural field(s) (block 404). As noted above, the collection and analysis of production agronomic data may be performed by the client computing device 102 and/or the remote computing device 106. In either case, the method 400 may annotate each data point within the production agronomic data with a geographic position (e.g., a hexagrid identifier). The geographic position of each point may be added to the production agronomic data upon collection by an implement and/or a computing device (e.g., by an onboard Global Positioning System (GPS) device of the implement 104 or the client computing device 106).

The method 400 may associate each hexagrid with the predicted CGE values, such that once the method 400 has been completed, each of the hexagrids within the target field(s) includes one or more respective CGE values corresponding to the individual corn plants and/or varieties located within that hexagrid. In this way, the grower, field manager, trusted advisor or other relevant party can advantageously gain an objective understanding of how different regions of the target field(s) and/or growing or environmental conditions are influencing CGE (e.g., by viewing a field map layer showing respective CGE values for the field). The ability to view differing CGE values across an entire field or subfield is advantageous for practical growing purposes. For example, a grower operating the implement 104 of FIG. 1 may view the field map layer including CGE values and initiate prescriptive fungicide applications in areas where corn plants are more likely to have additional growth (e.g., have higher CGE values) in connection with a higher yield environment.

As discussed above, the method 400 may include generating and transmitting (e.g., from the remote computing device 106) one or more map layers via the network 108 for display in the client computing device 106. The one or more map layers may include the predicted CGE values, in some embodiments. In still further embodiments, the present techniques may be used, optionally in conjunction with other non-CGE characteristics map layers, to automate the application of agricultural treatments. For example, the method 400 may include generating an agricultural prescription for the agricultural field, including at least one treatment based on the CGE values (block 406). An example prescription includes variety selection, seeding rate, field planting priority, in season management including fertility (e.g., macro or micronutrients spread or foliar sprayed), crop protection (e.g., fungicide, insecticide), biologicals, etc.

However, the present techniques represent a further advantageous improvement over conventional techniques that require the grower to maintain constant attention during the laborious planting and harvest seasons, which may be further challenging due to hot/cold weather, precipitation and, in many cases, working in darkness. To that end, the method 400 may include performing the generated agricultural prescription by, for example, transmitting the prescription in the form of an electronic prescription file to the client computing device 102 for execution in the implement control module 120 (block 408). The agricultural prescription may include sets of instructions for automatically applying a treatment in portions of the field that correspond with certain CGE values. The term "agricultural prescription" is generally used herein to refer to a set of computer-executable instructions that is encoded in a software file format suitable for exchange between digital devices (e.g., between the client computing device 102 and the remote computing device 106 of FIG. 1), and which is capable of being executed to cause an agricultural implement (e.g., the implement 104 of FIG. 1) and/or attachment (e.g., the attachment 130 of FIG. 1) to perform one or more actions. The agricultural prescription may include complex instructions, such as loops, conditionals, etc. and may access external APIs (e.g., location information, timing functions, sensor readings, etc.).

For example, the agricultural prescription may access a location module (e.g., a GPS module) of the client computing device 102 to determine the real-time position of the implement within the field, with respect to the field map layer associated with CGE values information. The agricultural prescription may include instructions for causing a pre-determined agricultural treatment to be applied to the field, for example by accessing an attachment (e.g., the attachment 130 of FIG. 1). In this way, the present techniques may be advantageously used to identify CGE values corresponding a field, which may be highly variable for the reasons discussed above. The prescription may be able to reactively initiate field management tasks that a human is not capable of performing due to latencies caused by slow reaction time and other factors. The present techniques may further advantageously be used to automatically apply treatment product based on the CGE values, to conserve product while increasing yields.

Example Prescription Map

Figure 5:
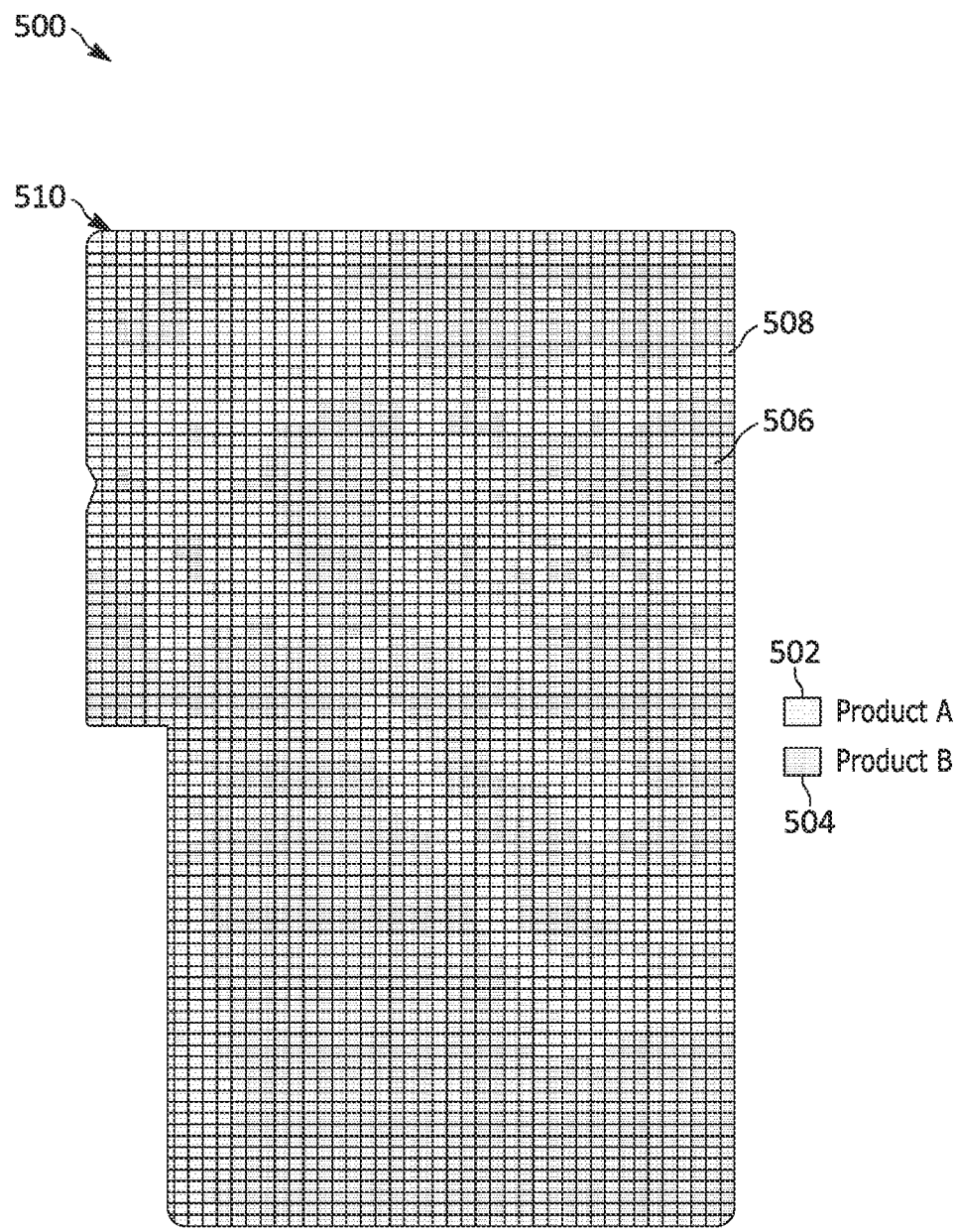
FIG. 5 is a graph representing an example multi-genetics prescription map, according to one embodiment and scenario.

FIG. 5 is a graph representing an example multi-genetics prescription map 500, according to an embodiment. The map 500 includes a first product coding 502 and a second product coding 504. The first product coding 502 and the second product coding 504 are depicted within respective cells (two of which are designated at reference numerals 506 and 508) of a map layer 510. The cells 506, 508 of the map layer 510 may be color-coded using the first product coding 502 and the second product coding 504 to indicate cells wherein the respective product will be applied. For example, the product coding 502 and the product coding 504 may be two respective corn varieties determined using the techniques described herein. The topographic module 152 of FIG. 1 may generate the map layer 510 to include a plurality of predicted CGE values each corresponding to a respective field subdivision (e.g., a respective hexagrid) of the map layer 510. In some embodiments, the map layer 510 may be used as a visual tool prior to and/or during the planting process.

Example Corn Growth Efficiency (CGE) Visualizations

In still further embodiments, predicted and/or known CGE values for an agricultural field may be analyzed to generate one or more visualizations for comparing the potential effects of planting particular varieties and/or applying various agricultural products to the agricultural field. Specifically, in some embodiments, the data processing module 150 of FIG. 1 may include machine-readable instructions for generating one or more visualizations (e.g., a chart, a graphic, a webpage, etc.) depicting known CGE values and/or predicted CGE values generated by the trained ML models of the CGE determining module 154.

FIG. 6 depicts an example chart 600 for visualizing CGE values at R1 among different corn hybrids grown in different locations (e.g., hexagrids) in a field, according to an embodiment. The chart 600 includes a plurality of columns 602 corresponding to respective ones of a plurality of different sites or locations in one or more agricultural fields, subfields, or portion(s) thereof. The chart 600 includes a plurality of rows 604 corresponding to respective ones of a plurality of corn hybrids, and a row 606 containing average CGE values at R1 (e.g., $EFCY_{R1}$ values determined as described above) for respective ones of the locations corresponding to the columns 602. The values shown in the rows 604 represent percentages of the corresponding values in the row 606. For example, an entry 608 indicates that corn plants for hybrid A grown in site 610 had a CGE at R1 of 0.85*94.8. Hybrids with higher CGE values at R1 may be better suited to a location or environment than hybrids with lower CGE values, and hybrids with lower CGE values at R1 may indicate an opportunity to increase yield through management practices that would increase sucrose reserves. For example, hybrids A and F at R1 are consistently below the site average CGE values and may benefit from early season management, and hybrid G at R1 is consistently above the site average.

FIG. 7 depicts an example chart 700 for visualizing CGE values at R6 among different corn hybrids grown in different locations (e.g., hexagrids) in a field, according to an embodiment. The chart 700 includes a plurality of columns 702 corresponding to respective ones of a plurality of different sites or locations in one or more agricultural fields, subfields, or portion(s) thereof. The chart 700 includes a plurality of rows 704 corresponding to respective ones of a plurality of corn hybrids, and a row 706 containing average CGE values at R6 (e.g., $EFCY_{R6}$ values determined as described above) for respective ones of the locations corresponding to the columns 702. The values shown in the rows 704 represent percentages of the corresponding values in the row 706. For example, an entry 708 indicates that corn plants for hybrid A grown in site 710 had a CGE at R6 of 0.6*34.3%. Hybrids with lower CGE values at R6 may be better at allocating resources to ear growth, but may also be at risk for stalk cannibalization, and hybrids with higher CGE values at R6 are less at risk for stalk cannibalization but may not be as efficient in growing ears of corn. For example, hybrid A holds onto sucrose at R6 and may need management to extend the grain fill period, and hybrid F may need to be watched for stalk integrity.

Figure 8:
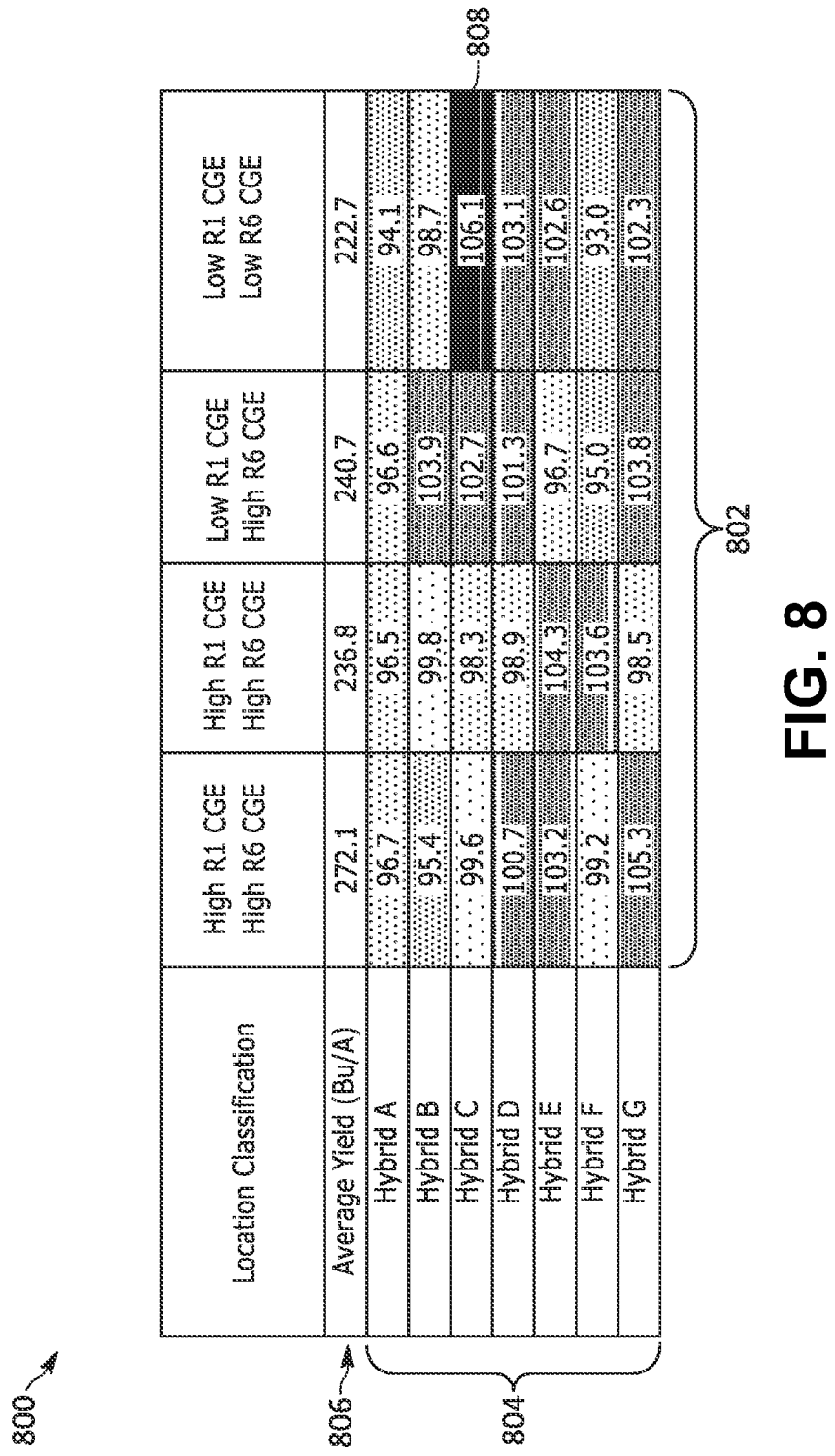
FIG. 8 depicts an example chart for visualizing classifications of locations based on CGE values at growth stages R1 and R6.

FIG. 8 depicts an example chart 800 for visualizing classifications of locations based on CGE values at R1 and R6. The chart 800 includes four columns 802 corresponding to four classes of location represented by combinations of low CGE at R1, high CGE at R1, low CGE at R6, and high CGE at R6. The chart 800 includes a plurality of rows 804 corresponding to respective ones of a plurality of corn hybrids, and a row 806 containing average yield, in bushels per acre, for the respective location classification corresponding to the columns 802. The values shown in the rows 804 represent percentages of the corresponding values in the row 806. For example, an entry 808 indicates that corn plants for hybrid C grown in a low CGE at R1, and low CGE at R6 environment had a yield of 222.7*106.1%. As shown, hybrid A lacks performance across all site classifications; hybrid C has a stable yield across low CGE at R1 sites; hybrid F favors a high CGE at R1 with increased risk at low CGE at R1 sites; and hybrid G is stable across site classifications. The grower or other personnel may review the chart 800 to compare hybrids across location classifications. Thus, the visualization techniques of disclosed techniques advantageously enable growers, field managers, seed companies, etc. to quickly compare hybrid performance in a variety of different environmental conditions.

Figure 9:
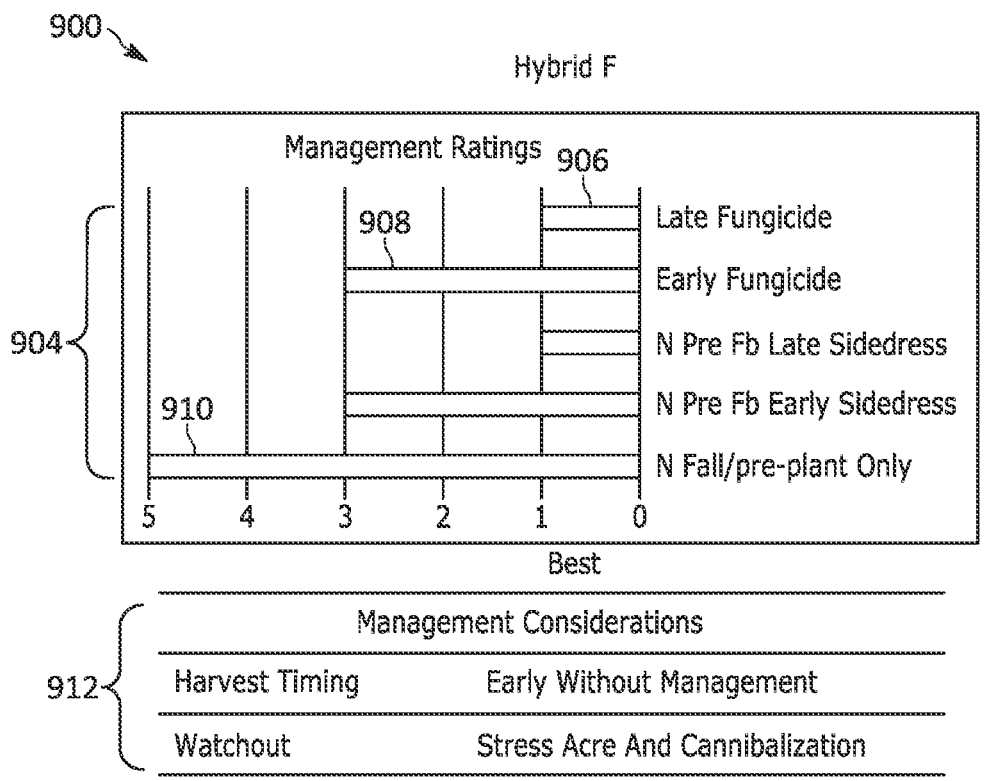
FIG. 9 depicts an example management recommendation.

FIG. 9 depicts an example management recommendation 900 for hybrid F that may be determined, for example, based on the example CGE data and/or the example yield data of FIGS. 6-8. The recommendation 900 includes a plurality of recommendations 904 for respective ones of a plurality of agricultural treatments. For example, recommendations 906 and 908 indicate that the late application of fungicide is less beneficial than the early application of fungicide, and a recommendation 910 indicates that the application of nitrogen in the fall and/or pre-planting in the spring may be very beneficial. The recommendation 904 further includes indications 912 that corn plants of hybrid F should be watched in the fall for stalk cannibalization, and may require early harvesting.

Figure 10:
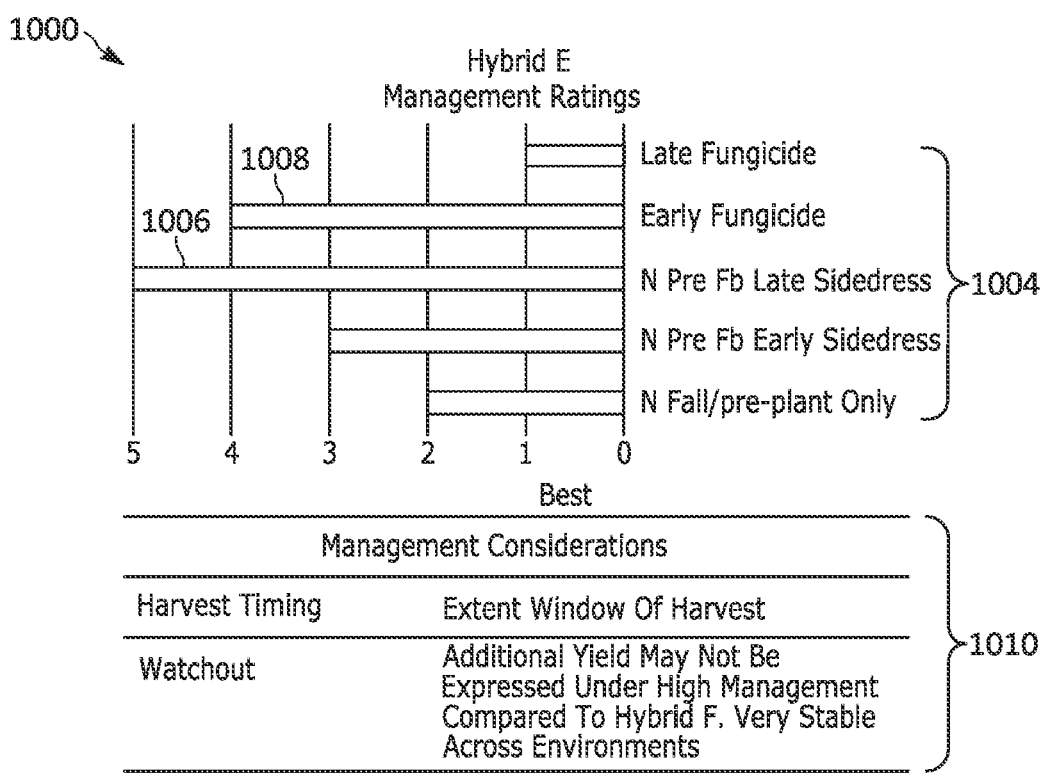
FIG. 10 depicts another example management recommendation.

FIG. 10 depicts an example management recommendation 1000 for hybrid E that may be determined, for example, based on the example CGE data and/or the example yield data of FIGS. 6-8. The recommendation 1000 includes a plurality of recommendations 1004 for respective ones of a plurality of agricultural treatments. For example, recommendations 1006 and 1008 indicate, respectively, that the early application of fungicide and the late application of sidedress nitrogen may be very beneficial. The recommendation 1004 further includes indications 1010 that corn plants of hybrid E may require late harvesting, that high amounts of field management may not be needed, and that hybrid E performs well across a range of growing environments.

In general, the example data and recommendations of FIGS. 6-10 advantageously provide decision-makers in all areas of precision agriculture with the tools to objectively quantify information related to variety performance among different fields and different growing environments. The visualization techniques herein enable fast and easy visualization and communication of objectively quantified information to other parties, thus improving field management computing systems. For example, the field advisor need not base product recommendations to a field owner based on intuition, anecdote, or best guess regarding variety performance.

Figure 11:
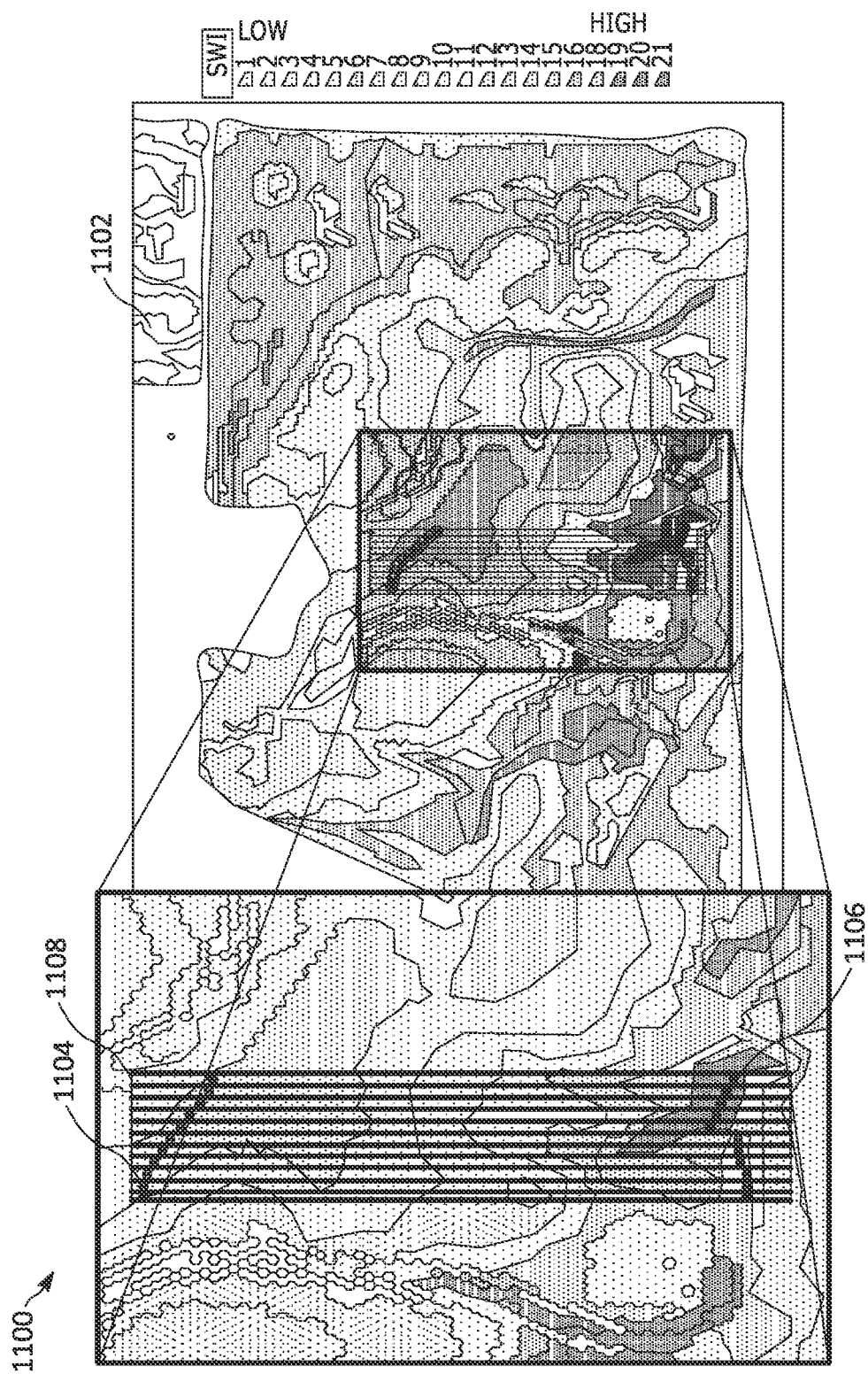
FIG. 11 is a graph of a portion of an example field including indications of corn plant collection locations.

FIG. 11 is a graph 1100 of a portion of an example agricultural field 1102. The graph 1100 indicates a plurality of locations (two of which are designated at reference numerals 1104 and 1106) within the field 1102 at which corn plants were collected at different growth stages. The collected corn plants for each location were processed, as described above, to determine one or more CGE values for the different growth stages for each location. As also described above, the CGE values were used to label agronomic data for each location, and the labeled agronomic data was used to train an ML model, such as the example ML model 202. As shown, the locations may be selected to correspond to a plurality of different hybrids grown in respective bands (one of which is designated at reference numeral 1108). As shown, the locations may also be selected to represent different growing conditions (e.g., one or more of soil topography, relative elevation, slope, latitude, growing season length, incident solar radiation, phosphorus fertility, potassium fertility, soil wetness index (SWI), organic matter, CEC, planting date, corn hybrid planted, applied agricultural treatments, treatment dates, weather information, environmental stresses, etc.).

ADDITIONAL CONSIDERATIONS

The above description refers to block diagrams of the accompanying drawings. Alternative implementations of the examples represented by the block diagrams include one or more additional and/or alternative elements, processes, and/or devices. Additionally and/or alternatively, one or more of the example blocks of the diagrams may be combined, divided, re-arranged, or omitted. Components represented by the blocks of the diagrams may be implemented by hardware, software, firmware, and/or any combination of hardware, software, and/or firmware.

The above description also refers to various operations that are shown in accompanying flowcharts. Any such flowcharts are representative of example methods disclosed herein. In some examples, the methods represented by the flowcharts implement the apparatus represented by the block diagrams. Alternative implementations of example methods disclosed herein may include additional and/or alternative operations. Further, operations of alternative implementations of the methods disclosed herein may combined, divided, re-arranged, or omitted. In some examples, the operations described herein are implemented by machine-readable instructions (e.g., software and/or firmware) stored on a non-transitory or tangible machine-readable storage medium for execution by one or more processor. In some examples, the operations described herein are implemented by one or more configurations of one or more specifically designed logic circuits (e.g., ASIC(s), FPGA(s), etc.). In some examples the operations described herein are implemented by a combination of specifically designed logic circuit(s) and machine-readable instructions stored on a non-transitory or tangible machine-readable storage medium for execution by the processor(s).

As used herein, each of the terms "tangible machine-readable storage medium" and "non-transitory machine-readable storage medium" is expressly defined as any type of tangible or non-transitory storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable storage medium" and "non-transitory machine-readable storage medium" is expressly defined to exclude propagating signals. That is, as used in any claim of this patent, neither of the terms "tangible machine-readable storage medium" and "non-transitory machine-readable storage medium," can be read to be implemented by a propagating signal.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Unless a claim element is defined by reciting the word "means" and a function without the recital of any structure, it is not intended that the scope of any claim element be interpreted based on the application of 25 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "an embodiment," "one example," or "an example" means that a particular element, feature, structure, or characteristic described in connection with the embodiment or example is included in at least one embodiment or example. The appearances of the phrase "in one embodiment" or "in one example" in various places in the specification are not necessarily all referring to the same embodiment or example.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation, and details of the method and apparatus disclosed herein without departing from the spirit and scope defined in the appended claims.

What is claimed:

1. A computing system, comprising:
   one or more processors; and
   one or more non-transitory, computer-readable storage media storing:
   a machine learning (ML) model trained using a training agronomic data set corresponding to one or more trial agricultural fields, the training agronomic data set labeled with one or more known corn growth efficiency (CGE) values corresponding to respective ratios of measured sucrose reserves to dry plant matter,
   wherein the machine learning model is at least one of (i) a logistic regression model, (ii) an artificial neural network, (iii) a decision tree, (iv) a gradient boosting model, or (v) a random forest model; and
   machine-readable instructions that, when executed by the one or more processors, cause the computing system to:
   process one or more input feature vectors corresponding to an agronomic data set with the ML model to generate one or more predicted CGE values for one or more portions of an agricultural field, wherein the one or more predicted CGE values include a respective predicted ratio of sucrose reserve to dry plant matter; and
   provide the one or more predicted CGE values as an output.

2. The computing system of claim 1,
   wherein the instructions, when executed by the one or more processors, cause the computing system to:
   determine an agricultural prescription for the agricultural field based on the predicted CGE values.

3. The computing system of claim 2,
   wherein the agricultural prescription includes at least one of:
   (i) one or more corn hybrids to be planted in the one or more portions of the agricultural field; or
   (ii) target dates for planting the one or more portions of the agricultural field.

4. The computing system of claim 2, wherein the agricultural prescription includes at least one of:
   (i) one or more agricultural treatments to be applied to the one or more portions of the agricultural field; or
   (ii) target dates for applying the one or more agricultural treatments.

5. The computing system of claim 2,
   wherein the instructions, when executed by the one or more processors, cause the computing system to:
   provide the agricultural prescription to a second computing system for execution by the second computing system to apply the agricultural prescription to the agricultural field.

6. The computing system of claim 1,
   wherein a first predicted CGE value is for a first plant growth stage, and
   wherein a second predicted CGE value is for a second plant growth stage.

7. The computing system of claim 6,
   wherein the first plant growth stage is an R1 growth stage, and the second plant growth stage is a R6 growth stage.

8. The computing system of claim 1,
   wherein a CGE value is based on remotely-sensed data.

9. The computing system of claim 8,
   wherein the remotely-sensed data represents one or more multi-spectral images taken of the one or more trial agricultural fields.

10. The computing system of claim 1, wherein the logistic regression model architecture is a multinomial logistic regression model architecture.

11. A computing system, comprising:
    one or more processors; and
    one or more non-transitory, computer-readable storage media storing machine-readable instructions that, when executed by the one or more processors, cause the computing system to:
    process an agronomic data set with a machine learning (ML) model to generate one or more predicted corn growth efficiency (CGE) values, the agronomic data set being labeled with one or more known CGE values that correspond to respective ratios of measured sucrose reserves to dry plant matter, wherein the machine learning model is at least one of (i) a logistic regression model, (ii) an artificial neural network, (iii) a decision tree, (iv) a gradient boosting model, or (v) a random forest model; and modify one or more parameters of the ML model until a difference between the known CGE values and one or more predicted CGE values satisfies a predetermined threshold.

12. The computing system of claim 11, wherein the instructions, when executed by the one or more processors, cause the computing system to:

generate a hybrid management rating profile; and present the hybrid management rating profile as an output.

13. The computing system of claim 11, wherein at least one of the one or more known CGE values is based on a measured sucrose reserve.

14. The computing system of claim 13, wherein the at least one CGE value is based on first corn plants collected from one or more agricultural fields at a first growth stage, and wherein the sucrose reserve represents an amount of sucrose stored in one or more internodes of the first corn plants.

15. The computing system of claim 14, wherein the known CGE value is also based on a measured amount of dry plant matter.

16. The computing system of claim 15, wherein the measured amount of dry plant matter represents a ratio of:

(i) a first amount of dry plant matter measured in the first corn plants; and (ii) a difference between the first amount of dry plant matter and a second amount of dry plant matter measured in second corn plants collected from the one or more agricultural fields at a second growth stage.

17. The computing system of claim 16, wherein the first growth stage is an R1 growth stage, and the second growth stage is a V6 growth stage.

18. The computing system of claim 11, wherein the instructions, when executed by the one or more processors, cause the computing system to:

access one or more multi-spectral images taken of one or more agricultural fields; and analyze the one or more images to determine a known CGE value.

19. The computing system of claim 11, wherein the agronomic data set includes machine data representing one or more measurements taken using a soil probe.

20. The computing system of claim 11, wherein the agronomic data set includes topographic data.

21. The computing system of claim 11, wherein the agronomic data set includes at least one of:

(i) one or more agricultural treatments applied to one or more agricultural fields; or (ii) dates when the agricultural treatments were applied.

22. The computing system of claim 11, wherein the agronomic data set includes at least one of:

(i) one or more corn hybrids planted in one or more portions of one or more agricultural fields; or (ii) dates when the one or more portions were planted.

23. The computing system of claim 11, wherein the agronomic data set includes weather information for one or more agricultural fields.

24. A computer-implemented method, comprising:

processing, using one or more processors, an agronomic data set with a machine learning (ML) model to generate one or more predicted corn growth efficiency (CGE) values, the agronomic data set being labeled with one or more known CGE values that correspond to respective ratios of measured sucrose reserves to dry plant matter, wherein the machine learning model is at least one of (i) a logistic regression model, (ii) an artificial neural network, (iii) a decision tree, (iv) a gradient boosting model, or (v) a random forest model; and modifying, using one or more processors, one or more parameters of the ML model until a difference between the known CGE values and one or more predicted CGE values satisfies a predetermined threshold.

25. The method of claim 24, wherein at least one of the known CGE values is based on a measured sucrose reserve.

26. The method of claim 25, wherein the at least one of the known CGE values is based on first corn plants collected from one or more trial agricultural fields at a first growth stage, and wherein the sucrose reserve represents an amount of sucrose stored in one or more internodes of the first corn plants.

27. The method of claim 26, wherein the at least one of the known CGE values is also based on a measured amount of dry plant matter.

28. The method of claim 27, wherein the measured amount of dry plant matter represents a ratio of (i) a first amount of dry plant matter measured in the first corn plants; and (ii) a difference between the first amount of dry plant matter and a second amount of dry plant matter measured in second corn plants collected from the one or more trial agricultural fields at a second growth stage.

29. The method of claim 28, wherein the first growth stage is an R1 growth stage, and the second growth stage is a V6 growth stage.

30. A computing system, comprising:

one or more processors; and one or more non-transitory, computer-readable storage media storing:

a machine learning (ML) model trained using a training agronomic data set corresponding to one or more trial agricultural fields, the training agronomic data set labeled with one or more known corn growth efficiency (CGE) values corresponding to respective ratios of measured sucrose reserves to dry plant matter, wherein the machine learning model is structured according to at least one of (i) a logistic regression model architecture, (ii) an artificial neural network architecture, (iii) a decision tree architecture, (iv) a gradient boosting model architecture, or (v) a random forest model architecture; and machine-readable instructions that, when executed by the one or more processors, cause the computing system to:

process one or more input feature vectors corresponding to an agronomic data set with the ML model to generate one or more predicted CGE values for one or more portions of an agricultural field, wherein the one or more predicted CGE values include a respective predicted ratio of sucrose reserve to dry plant matter; and provide a corn hybrid selection and/or a management recommendation based on the one or more predicted CGE values.

* * * * *